United States Patent [19]

Ohnishi et al.

[11] Patent Number: 5,730,899

[45] Date of Patent: Mar. 24, 1998

[54] OPTICALLY ANISOTROPIC FILM

[75] Inventors: Toshihiro Ohnishi, Tsukuba; Kayoko Ueda, Takatsuki; Masato Kuwabara, Tsukuba, all of Japan

[73] Assignee: Sumitomo Chemical Company, Limited, Osaka, Japan

[21] Appl. No.: 533,856

[22] Filed: Sep. 26, 1995

[30] Foreign Application Priority Data

| Sep. 26, 1994 | [JP] | Japan | 6-229639 |
| Sep. 26, 1994 | [JP] | Japan | 6-229640 |
| Jan. 19, 1995 | [JP] | Japan | 7-006486 |
| Jan. 19, 1995 | [JP] | Japan | 7-006487 |

[51] Int. Cl.$^6$ .................... C09K 19/52; G02F 1/133
[52] U.S. Cl. .................... 252/299.01; 349/96; 349/99; 349/101; 349/132; 349/185
[58] Field of Search ............... 252/299.01; 349/132, 349/185, 96, 99, 101; 348/751; 368/84

[56] References Cited

U.S. PATENT DOCUMENTS

| 4,358,391 | 11/1982 | Finkelmann et al. | 252/299.01 |
| 4,410,570 | 10/1983 | Kreuzer et al. | 252/299.01 |
| 5,210,530 | 5/1993 | Heynderickx et al. | 252/299.01 |
| 5,211,877 | 5/1993 | Andrejewski et al. | 252/299.01 |
| 5,250,214 | 10/1993 | Kanemoto et al. | 252/299.01 |
| 5,326,496 | 7/1994 | Iida et al. | 252/299.01 |

FOREIGN PATENT DOCUMENTS

| 0380338 | 8/1990 | European Pat. Off. |
| 0397263 | 11/1990 | European Pat. Off. |
| 0457607 | 11/1991 | European Pat. Off. |
| 0465107 | 1/1992 | European Pat. Off. |
| 0527231 | 1/1992 | European Pat. Off. |
| 0531120 | 3/1993 | European Pat. Off. |
| 0606940 | 7/1994 | European Pat. Off. |
| 0617111 | 9/1995 | European Pat. Off. |
| 6341400 | 8/1963 | Japan. |
| 6353528 | 10/1968 | Japan. |
| 63-149624 | 6/1988 | Japan. |
| 63-47759 | 9/1988 | Japan. |
| 1222220 | 9/1989 | Japan. |
| 2149544 | 6/1990 | Japan. |
| 387720 | 4/1991 | Japan. |
| 3140921 | 6/1991 | Japan. |
| 3291523 | 12/1991 | Japan. |
| 3291633 | 12/1991 | Japan. |
| 3294821 | 12/1991 | Japan. |
| 422917 | 1/1992 | Japan. |
| 455813 | 2/1992 | Japan. |
| 4346312 | 12/1992 | Japan. |
| 55863 | 1/1993 | Japan. |
| 534657 | 2/1993 | Japan. |
| 534671 | 2/1993 | Japan. |
| 534675 | 2/1993 | Japan. |
| 553133 | 3/1993 | Japan. |
| 561039 | 3/1993 | Japan. |
| 9214180 | 6/1992 | WIPO. |

OTHER PUBLICATIONS

Mol. Cryst Liq. Cryst, 1991, vol. 199, pp. 345–378.

SIS 1992 Digest, 401.

Brehmer et al., Macromol. Chem. Phys. 195, No. 6, 1891–1904 (1994).

Semmler et al., Polymers for Advanced Technologies, 5, 231–235 (1994).

*Primary Examiner*—Shean C. Wu
*Attorney, Agent, or Firm*—Birch, Stewart, Kolasch & Birch, LLP

[57] ABSTRACT

An optically anisotropic film comprising a liquid crystal composition having twisted nematic alignment, characterized in that the helical axis of twisted nematic alignment is substantially parallel to the direction normal to the film plane, and the liquid crystal composition shows a cholesteric phase, contains at least one liquid crystal oligomer selected from the linear or cyclic liquid crystal oligomers (A) such as obtained from reaction of a vinyl monomer having a specific cholesterol group and pentamethylcyclopentasiloxane, and is defined by the fact that when the thickness of the film is represented by d (μm) and the helical pitch of the twisted nematic phase is represented by P (μm), $d \geq 3 \times P$ and $P \leq 0.3$ μm or $P \geq 0.8$ μm, wherein when the numbers of the recurring units (I) and (II) in one molecule of the liquid crystal oligomer (A) are supposed to be n and n', respectively, n and n' are each an integer of 1 to 20 and satisfy the relations of $4 \leq n+n' \leq 21$ and n: n'=20:1 to 1:20, and the terminal group of the recurring unit (II) of the liquid crystal oligomer (A) is polymerized. This optically anisotropic film is capable of providing a liquid crystal display device with smaller viewing angle dependency of contrast or display color.

22 Claims, No Drawings

OPTICALLY ANISOTROPIC FILM

BACKGROUND OF THE INVENTION

The present invention relates to an optically anisotropic film comprising a liquid crystal composition which is useful as a member of a retardation film used for liquid crystal displays and the like, a process for the production thereof, a retardation film comprising said optically anisotropic film, and a liquid crystal display device using said film.

Because of their advantageous features such as low-voltage drive and light weight, liquid crystal displays are popularly used for personal computers and word processors. Most of the currently available liquid crystal displays use nematic liquid crystal and are roughly divided into two types according to the working system: birefringence mode type and optical rotatory mode type. The liquid crystal displays adopting the birefringence mode are mostly of a system using super twisted nematic liquid crystal with a twist angle larger than 90° (this type may hereinafter be referred to as STN type). STN type liquid crystal displays are relatively low in cost and capable of enlarged image display, but they have a disadvantage in that as they resort to the birefringence effect for display, there takes place yellow or blue tinting of display, making it unable to obtain a black-and-white display.

For realizing black-and-white display with STN type display system, there have been proposed a double-layer cell system featuring lamination, on a STN cell, of a liquid crystal cell for compensation having the same cell gap as the STN cell but opposite thereto in the direction of twist to make color compensation (JP-B-63-53528) and a method in which a stretched film (retardation film) of polycarbonate or the like is laminated on the STN cell to compensate for the retardation. These techniques have partly been offered to practical application. However, the double-layer cell system has the problems of high cost and heavy and thick panels, while the retardation film compensation system, because of use of a uniaxially stretched film having no twisted structure, optical rotatory dispersion caused by twist of the STN cell is not sufficiently compensated, so that this system is incapable of perfect black-and-white display and also inferior to the double-layer cell system in contrast.

As another birefringence mode type display system, there is known a system using a cell in which the liquid crystal molecules having negative dielectric anisotropy are aligned in the direction orthogonal to the substrate (Deformation of Vertically Aligned Phases (DAP) type cell). This system, which makes use of a change of retardation by tilting of the liquid crystal molecules on application of an electrical voltage, has a problem in that because of angle dependency of retardation, the color of the displayed image is subject to change according to the viewing angle.

As a solution to these problems associated with twisted nematic alignment of the STN liquid crystal cell, use of a polymer film having twisted nematic alignment as a compensation film has been proposed. For producing a polymer film having twisted nematic alignment, methods are known in which a monomer having a cholesteric phase is polymerized after alignment (JP-A-01-222220 and JP-A-03-140921) or a polymeric compound having a cholesteric phase is rapidly cooled after alignment to a temperature below the glass transition temperature to fix alignment (JP-A-03-87720).

As an example of the optical rotatory mode type liquid crystal displays, there is a type having molecular alignment with 90° twist (this may hereinafter be referred to as TN type). This type of liquid crystal display has been embodied, for example, in a panel in which each pixel is driven by a thin-film transistor or a diode. This TN type still has the problem that the image contrast or color is subject to change according to the viewing angle as in the case of the birefringence mode type.

The above problems of the TN type liquid crystal displays are ascribed to anisotropy of refractive index of liquid crystal molecules. For minimizing angle dependence of contrast or display color of the liquid crystal displays due to anisotropy of refractive index of the liquid crystal molecules, methods are studied in which a cholesteric liquid crystal cell having negative anisotropy of refractive index is placed on a TN cell (JP-A-4-346312) or a polymer liquid crystal showing a cholesteric phase is rapidly cooled after alignment to the glass transition temperature or below to fix alignment (JP-A-5-61039).

The method using a cholesteric liquid crystal cell for compensation, however, is at a disadvantage in that the panel becomes heavy and thick as a whole, resulting in an elevated production cost. Also, the method involving polymerization of monomers has the problem that since temperature dependence of alignment of the monomers is higher than that of the polymeric compounds, it is necessary to carry out polymerization immediately after the alignment treatment at the same temperature, therefore the producing conditions are restricted. Further, in the case of the method using a polymeric compound having a cholesteric phase, since fixation of the cholesteric phase structure is effected by rapid cooling to or below the glass transition temperature, it is necessary to use a compound whose glass transition temperature is well higher than room temperature, so that a high temperature is required for the alignment treatment, which is unfavorable in terms of producing operation and economy. Moreover, in case a polymeric compound is used, since its temperature dependence of refractive anisotropy is lower than the liquid crystal, there is produced a difference between refractive anisotropy of the compensation film and that of the liquid crystal cell with change of the temperature at which the panel is used, resulting in a reduced effect of improving viewing angle characteristics.

SUMMARY OF THE INVENTION

The object of the present invention is to provide an optically anisotropic film having fixed twisted nematic alignment which contributes to improving contrast of STN cell over a wide temperature range; and an optically anisotropic film having negative anisotropy of refractive index which can compensate viewing angle dependence of contrast and color of TN cell, due to its anisotropy of refractive index, over a wide temperature range; and an industrial production process thereof; a laminate film comprising said optically anisotropic film; and liquid crystal display devices using said optically anisotropic film and/or said laminate film, which reduce viewing angle dependence of contrast or display color.

Efforts by the present inventors for eliminating the above prior art problems led to a finding that a film formed from a liquid crystal composition showing a cholesteric phase and containing a polymeric liquid crystal oligomer having a specific structure by properly aligning the molecules of the composition and then fixing the twisted nematic structure of the composition by polymerization is effective for reducing viewing angle dependence of contrast or display color over a wide temperature range.

It was further found that according to the process of the present invention there can be obtained an optically anisotropic film containing a polymerized liquid crystal oligomer and having twisted nematic alignment on a substrate which has been subjected to a horizontal alignment treatment, and by using this film, it is possible to obtain a liquid crystal display device showing small viewing angle dependence of contrast or display color over a wide temperature range. The present invention has been attained on the basis of the above finding.

In accordance with the present invention, there is provided an optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the linear or cyclic liquid crystal oligomers (A) having the following recurring units (I) and (II) as main structural units, wherein when the numbers of the recurring units (I) and (II) in one molecule of said oligomer (A) are supposed to be n and n', respectively, n and n' are independently an integer of 1 to 20 and satisfy the relations of $4 \leq n+n' \leq 21$ and n: n'=20:1 to 1:20, and the terminal group of the recurring unit (II) of the liquid crystal oligomer (A) is polymerized:

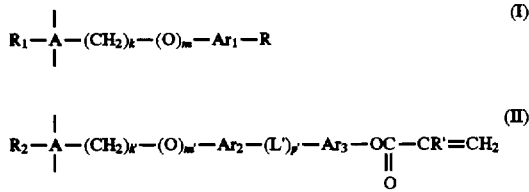

wherein A is a group represented by the following formula (III) or (IV):

wherein, in the formula (III), —Si—O— is the main chain of the formula (I) or (II) and, in the formula (IV), —C—CH$_2$— is the main chain of the formula (I) or (II) and COO group is positioned in the side chain which is neither R$_1$ nor R$_2$; when A in the formula (I) is the formula (III) and when A in the formula (II) is the formula (III), R$_1$ and R$_2$ represent independently hydrogen, a C$_1$–C$_6$ alkyl group or a phenyl group, and when A in the formula (I) is the formula (IV) and when A in the formula (II) is the formula (IV), R$_1$ and R$_2$ represent independently hydrogen or a C$_1$–C$_6$ alkyl group; k and k' are independently an integer of 2 to 10; m and m' are independently 0 or 1; Ar$_1$, Ar$_2$ and Ar$_3$ are independently a 1,4-phenylene group, a 1,4-cyclohexylene group, a pyridine-2,5-diyl group or a pyrimidine-2,5-diyl group; L' is —CH$_2$—O—, —O—CH$_2$—, —COO—, —OCO—, —CH$_2$—CH$_2$—, —CH=N—, —N=CH— or a divalent group represented by the formula:

p' is 0 or 1; R is an optically active group; and R' is hydrogen or a C$_1$–C$_5$ alkyl group.

The present invention also provides an optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the liquid crystal oligomers (A) mentioned above and at least one low-molecular weight compound having a polymerizable group, wherein the terminal group of the recurring unit (II) of the liquid crystal oligomer and/or the low-molecular weight compound having a polymerizable group are polymerized.

The present invention further provides an optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the liquid crystal oligomers (A) mentioned above and at least one liquid crystal oligomer selected from the liquid crystal oligomers (B) other than (A), said liquid crystal oligomers (B) being selected from the linear or cyclic liquid crystal oligomers having the following recurring units (V) and (VI) as main structural units, wherein when the numbers of the recurring units (V) and (VI) in one molecule of said liquid crystal oligomer (B) are supposed to be n" and n'", respectively, n" and n'" are independently an integer of 1 to 20 and satisfy the relation of $4 \leq n"+n'" \leq 21$, and the terminal group of the recurring unit (II) of the liquid crystal oligomer (A) and/or the terminal group of the recurring unit (VI) of the liquid crystal oligomer (B) are polymerized:

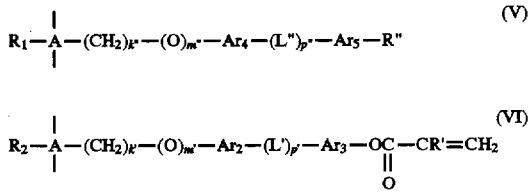

wherein A, R$_1$, R$_2$, k', m', L', Ar$_2$, Ar$_3$ and R' represent the same as defined above; k" is an integer of 2 to 10; m" is 0 or 1; Ar$_4$ and Ar$_5$ are independently a 1,4-phenylene group, a 1,4-cyclohexylene group, a pyridine-2,5-diyl group or a pyrimidine-2,5-diyl group; L" is —CH$_2$—O—, —O—CH$_2$—, —COO—, —OCO—, —CH$_2$—CH$_2$—, —CH=N—, —N=CH or a divalent group represented by the formula:

p" is 0 or 1; and R" is a halogen, a cyano group, a C$_1$–C$_{10}$ alkyl group, a C$_1$–C$_{10}$ alkoxyl group, a C$_6$–C$_{10}$ aryl group or a benzoyl group having a C$_1$–C$_{10}$alkyl group or a C$_1$–C$_{10}$ alkoxyl group.

The present invention further provides an optically anisotropic film comprising a liquid crystal composition having twisted nematic alignment, characterized in that the helical axis of twisted nematic alignment is substantially parallel to the direction normal to the film plante, and said liquid crystal composition shows a cholesteric phase and contains at least one liquid crystal oligomer selected from the above-mentioned liquid crystal oligomers (A), at least one liquid crystal oligomer selected from the above-mentioned liquid crystal oligomers (B) and at least one low-molecular weight compound having a polymerizable group, wherein the terminal group of the recurring unit (II) of the liquid crystal oligomer (A) and/or the terminal group of the recurring unit (VI) of the liquid crystal oligomer (B) and/or the low-molecular weight compound having a polymerizable group are polymerized.

The present invention also provides a process for producing an optically anisotropic film which comprises forming a film of the liquid crystal composition described above, heat treating the film so that the helical axis of twisted nematic alignment will become substantially parallel to the direction normal to the film plane, and then polymerizing the polymerizable group of said compound.

The present invention additionally provides a laminate of an optically anisotropic film and a transparent semitransparent substrate having an alignment layer on its surface.

DESCRIPTION OF THE PREFERRED EMBODIMENTS

The present invention comprehends the following embodiments in its claimed scope.

[1] An optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the linear or cyclic liquid crystal oligomers (A) having the following recurring units (I) and (II) as main structural units, wherein when the numbers of the recurring units (I) and (II) in one molecule of the liquid crystal oligomer (A) are supposed to be n and n', respectively, n and n' are independently an integer of 1 to 20 and satisfy the relations of $4 \leq n+n' \leq 21$ and n: n'=20:1 to 1:20, and the terminal group of the recurring unit (II) is polymerized:

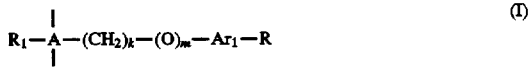

(I)

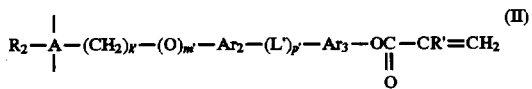

(II)

wherein A is a group represented by the following formula (III) or (IV):

(III)

(IV)

wherein, in the formula (III), —Si—O— is a main chain of the formula (I) or (II) and, in the formula (IV), —C—CH$_2$— is a main chain of the formula (I) or (II), and COO group is positioned in the side chain which is neither R$_1$ nor R$_2$; when A in the formula (I) is the formula (III) and when A in the formula (II) is the formula (III), R$_1$ and R$_2$ are independently hydrogen, a C$_1$–C$_6$ alkyl group or a phenyl group, and when A in the formula (I) is the formula (IV) and when A in the formula (II) is the formula (IV), R$_1$ and R$_2$ are independently hydrogen or a C$_1$–C$_6$ alkyl group; k and k' are independently an integer of 2 to 10; m and m' are independently 0 or 1; Ar$_1$, Ar$_2$ and Ar$_3$ are independently a 1,4-phenylene group, a 1,4-cyclohexylene group, a pyridine-2,5-diyl group or a pyrimidine-2,5-diyl group; L' is —CH$_2$—O—, —O—CH$_2$—, —COO—, —OCO—, —CH$_2$—CH$_2$—, —CH=N—, —N=CH— or a divalent group represented by the formula:

p' is 0 or 1; R is an optically active group; and R' is hydrogen or a C$_1$–C$_5$ alkyl group.

[2] An optically anisotropic film set forth in [1], wherein said liquid crystal composition showing a cholesteric phase is the one in which when the thickness of said optically anisotropic film is represented by d (μm) and the helical pitch of the choleseteric phase is represented by P (μm), $d \geq 3 \times P$ and $P \leq 0.3$ μm or $P \geq 0.8$ μm.

[3] An optically anisotropic film set forth in [1], wherein the twist angle of twisted nematic alignment of said liquid crystal composition falls in a range of 70°–300°, and said liquid crystal composition shows a cholesteric phase with a helical pitch of 0.2 –50 μm.

[4] An optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the liquid crystal oligomers (A) set forth in [1] and at least one low-molecular weight compound having a polymerizable group, wherein the terminal group of the recurring unit (II) of the liquid crystal oligomer (A) and/or the low-molecular weight compound having a polymerizable group are polymerized.

[5] An optically anisotropic film set forth in [4], wherein said liquid crystal composition is the one in which when the thickness of said optically anisotropic film is represented by d (μm) and the helical pitch of the cholesteric phase is represented by P (μm), $d \geq 3 \times p$ and $P \leq 0.3$ μm or $P \leq 0.8$ μm.

[6] An optically anisotropic film set forth in [4], characterized in that the twist angle of twisted nematic alignment of said liquid crystal composition falls in a range of 70°–300°, and the helical pitch of said liquid crystal composition is 0.2–50 μm.

[7] An optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the above-mentioned liquid crystal oligomers (A) and at least one liquid crystal oligomer selected from the liquid crystal oligomers (B) other than (A), said liquid oligomers (B) being selected from the linear or cyclic liquid crystal oligomers having the following recurring units (V) and (VI) as main structural units, wherein when the numbers of the recurring units (V) and (VI) in one molecule of said liquid crystal oligomer (B) are supposed to be n" and n'", respectively, n" and n'" are independently an integer of 0 to 20 and satisfy the relation of 4≦n"+n'"≦21, and the terminal group of the recurring unit (II) of the liquid crystal oligomer (A) and/or the terminal group of the recurring unit (VI) of the liquid crystal oligomer (B) are polymerized:

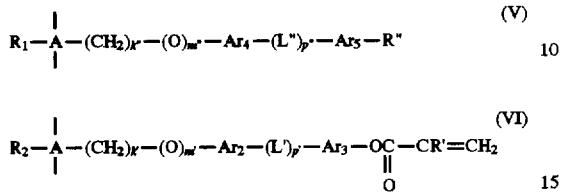

wherein A, $R_1$, $R_2$, k', m', p', L', $Ar_2$, $Ar_3$ and R' represent the same as defined above; k" is an integer of 2 to 10; m" is 0 or 1; $Ar_4$ and $Ar_5$ are independently a 1,4-phenylene group, a 1,4-cyclohexylene group, a pyridine-2,5-diyl group or a pyrimidine-2,5-diyl group; L" is —$CH_2$—O—, —O—$CH_2$—, —COO—, —OCO—, —$CH_2$—$CH_2$—, —CH=N—, —N=CH— or a divalent group represented by the formula:

p" is 0 or 1; R" is a halogen, a cyano group, a $C_1$-$C_{10}$ alkyl group, a $C_1$-$C_{10}$ alkoxyl group, a $C_6$-$C_{10}$ aryl group or a benzoyl group having a $C_1$-$C_{10}$ alkyl group or a $C_1$-$C_{10}$ alkoxyl group.

[8] An optically anisotropic film set forth in [7], wherein the liquid crystal composition showing a cholesteric phase is characterized by the fact that when the thickness of the optically anisotropic film is represented by d (μm) and the helical pitch of the cholesteric phase is represented by P (μm), d≧3×P and P≦0.3 μm or P≧0.8 μm. [9] An optically anisotropic film set forth in

[7], wherein the twist angle of twisted nematic alignment of the liquid crystal composition showing a cholesteric phase falls in a range of 70°–300°, and said liquid crystal composition shows a cholesteric phase whose helical pitch is 0.2–50 μm.

[10] An optically anisotropic film comprising a liquid crystal composition having twisted nematic alignment, characterized in that the helical axis of twisted nematic alignment is substantially parallel to the direction normal to the film plane, and said liquid crystal compsotion contains at least one liquid crystal oligomer selected from the liquid crystal oligomers (A) set forth in [1], at least one liquid crystal oligomer selected from the liquid crystal oligomers (B) set forth in [7] and at least one low-molecular weight compound having a polymerizable group, wherein the terminal group of the recurring unit (II) of the liquid crystal oligomer (A) and/or the terminal group of the recurring unit (VI) of the liquid crystal oligomer (B) and/or the low-molecular weight compound having a polymerizable group are polymerized.

[11] An optically anisotropic film set forth in [10], wherein the liquid crystal composition showing a cholesteric phase is characterized by the fact that when the thickness of said optically anisotropic film is represented by d (μm) and the helical pitch of the cholesteric phase is represented by P (μm), d≧3×P and P≦0.3 μm or P≧0.8 μm. [12] An optically anisotropic film set forth in [10], wherein the twist angle of twisted nematic alignment of the liquid crystal composition showing a cholesteric phase falls in a range of 70°–300°, and the helical pitch of said liquid crystal composition is 0.2–50 μm.

[13] An optically anisotropic film set forth in any of [1] to [12], comprising a liquid crystal oligomer having the specified recurring units in which R is represented the following formula (VII) or (VIII):

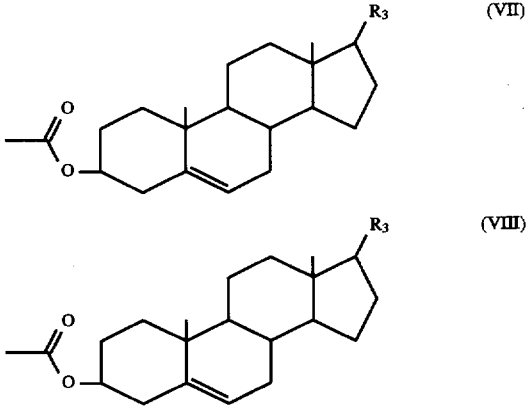

wherein $R_3$ represents —H or the following formula (IX):

wherein $R_4$ represents —H or a methyl group, and $R_5$ represents —H or $R_6$ ($R_6$ is a linear or branched $C_1$-$C_{20}$ alkyl group or a linear or branched $C_1$-$C_{20}$ alkoxy-carbonyl group and may have asymmetric carbon when branched).

[14] A process for producing an optically anisotropic tropic film, which comprises forming a film of a liquid crystal composition set forth in any of [1] to [13], heat treating the film so that the helical axis of twisted nematic alignment will become substantially parallel to the direction normal to the film plane, and then polymerizing the polymerizable group of said low-molecular weight compound and/or liquid crystal oligomer (A) and/or (B).

[15] A laminate of an optically anisotropic film set forth in any of [1] to [13] and a transparent or semitransparent substrate having an alignment layer on its surface.

[16] A laminate set forth in [15], wherein the substrate is a glass plate or a polymer film.

[17] A laminate set forth in [15], wherein the apparent refractive index of the laminate is defined by the following formula (1):

$$nX \geqq nY > nZ \qquad (1)$$

wherein nX and nY represent the maximum value and the minimum value, respectively, of the in-plane refractive index of the laminate, and nZ represents the refractive index in the thickness direction of the laminate.

[18] A liquid crystal display comprising a liquid crystal cell comprising a liquid crystal layer held between a pair of substrates provided with electrodes, said liquid crystal layer having positive dielectric anisotropy and oriented substantially horizontally with a helical axis aligned to the substrate when no electrical voltage is applied, at least one polarizing film provided on either upper or lower outside, or both outsides of said liquid crystal cell, and an optically anisotropic film set forth in any of [1] to [13] or a laminate of said optically anisotropic film and a substrate set forth in any of [15] to [17], which is disposed between said liquid crystal cell and said polarizing film.

[19] A liquid crystal display comprising a liquid crystal cell comprising a liquid crystal layer held between a pair of substrates provided with electrodes, said liquid crystal layer having positive dielectric anisotropy and oriented substantially horizontally to the substrate when no electrical voltage is applied, at least one polarizing film provided on either upper or lower outside, or both outsides of said liquid crystal cell, and an optically anisotropic film set forth in [2], [5], [8], [11] or [13] or a laminate set forth in any of [15] to [17], which is disposed between said liquid crystal cell and said polarizing film.

[20] A liquid crystal display comprising a liquid crystal cell comprising a liquid crystal layer held between a pair of substrates provided with electrodes, said liquid crystal layer having negative dielectric anisotropy and oriented substantially vertically to the substrate when no electrical voltage is applied, at least one polarizing film provided on either upper or lower outside, or both outsides of said liquid crystal cell, and an optically anisotropic film set forth in [2], [5], [8], [11] or [13] or a laminate set forth in any of [15] to [17], which is disposed between said liquid crystal cell and said polarizing film.

[21] A liquid crystal display device set forth in [18], wherein the liquid crystal cell is a TN cell with twisted orientation, said optically anisotropic film is at least one member selected from those set forth in [2], [5], [8], [11] and [13], and said laminate is at least one member selected from those set forth in [15] to [17].

[22] A liquid crystal display device set forth in [18], wherein the liquid crystal cell is a STN cell with twisted orientation, said optically anisotropic film is at least one member selected from those set forth in [3], [6], [9], [12] and [13], and said laminate is at least one member selected from those set forth in [15] to [17].

The present invention is described in detail below.

The liquid crystal oligomer (A) used in the present invention is a side chain type liquid crystal oligomer having recurring units (I) and (II). The back-bone of the side chain type liquid crystal oligomer is constituted by, for example, a poly-1-alkylacrylic acid ester or a polysiloxane. Such an oligomer may be of a linear-chain or cyclic structure, but the cyclic structure is preferred because of better chemical stability. Preferred examples of poly-1-alkylacrylic acid esters usable for said purpose are polymethacrylic acid esters and polyacrylic acid esters, the former being more preferable. Among these side chain type liquid crystal oligomers, those of the polysiloxane basis are preferred. There is generally used one in which the group closely associated with liquid crystalline property (which group may hereinafter be referred to as mesogen group) is bonded to the backbone through a flexible chain (which may hereinafter be referred to as spacer).

The length of the spacer, the type of mesogen group and the degree of polymerization of the side chain type liquid crystal oligomers (A) are preferably so selected that the transition temperature from liquid crystal phase to isotropic phase (which may hereinafter be referred to as liquid crystal phase/isotropic phase transition temperature) will become 200° C. or below, preferably 170° C. or below, more preferably 150° C. or below, for facilitating drying with the substrate or orientation treatment, although the upper limit temperature showing the liquid crystal phase is not specifically defined. The transition temperature from crystal phase or glass phase to liquid crystal phase of these liquid crystal oligomers is not defined; such transition may be carried out at a temperature lower than room temperature.

The side chain type liquid crystal oligomer used in the present invention needs to be oriented to have anisotropy of refractive index, and the number of the structural recurring units of the liquid crystal oligomer (A) is an important factor for facilitation of the orienting operation. When the number of the recurring units is large, the viscosity of the oligomer and its liquid crystal transition temperature elevate, necessitating a high temperature and a long time for effecting desired orientation. When the number of the recurring units is small, orientation tends to relax under a room temperature condition. Accordingly, the numbers n and n' of the recurring units of the liquid crystal oligomer used in the present invention are each independently an integer of 1 to 20, and they are selected so that n+n'=4 to 21. In view of orientation characteristics and fixation of orientation after polymerization, the n:n' ratio should fall in a range of 20:1 to 1:20, preferably 5:1 to 1:20. The n/n' ratio may be properly adjusted when synthesizing the liquid crystal oligomer as described later.

The liquid crystal transition temperature and orientation characteristics of the side chain type liquid crystal oligomer (A) are also affected by the spacer connecting the mesogen group to the backbone. Too short a spacer deteriorates the orientation characteristics of mesogen group while too long spacer tends to cause relaxation of orientation. Therefore, as spacer, alkylene group or alkyleneoxy group with a carbon number of 2 to 10 is preferred. $C_2$–$C_6$ alkylene or alkyleneoxy group is especially preferred because of easier orientation. For facilitation of synthesis, alkyleneoxy group is more preferred. Typical examples of the preferred groups are $-(CH_2)_2-$, $-(CH_2)_3-$, $-(CH_2)_4-$, $-(CH_2)_5-$, $-(CH_2)_6-$, $-(CH_2)_3-O-$, $-(CH_2)_4-O-$, $-(CH_2)_5-O-$ and $-(CH_2)_6-O-$.

It is industrially advantageous that the optically anisotropic film of the present invention has large anisotropy of refractive index, and for this reason, mesogen group used in this invention is preferably one which has large anisotropy of refractive index. The structures which can provide such mesogen group include those of the oligomers composed of the recurring units (I) and (II) wherein $Ar_1$, $At_2$ and $Ar_3$ represent independently 1,4-phenylene group, 1,4-cyclohexylene group, pyridine-2,5-diyl group or pyrimidine-2,5-diyl group. More preferably, $Ar_1$, $Ar_2$ and $Ar_3$ are independently 1,4-phenylene group, pyridine-2,5-diyl group or pyrimidine-2,5-diyl group, most preferably 1,4-phenylene group.

The group R in the recurring unit (I) contributes to the development of cholesteric phase, so that it is essential that the group R be an optically active group, and in view of stabilization of cholesteric phase, a group having the following structure is preferred:

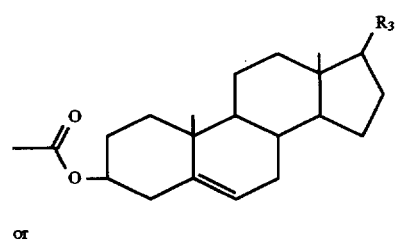

or

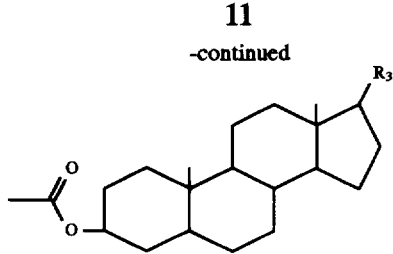

wherein $R_3$ represents —H or the following formula:

wherein $R_4$ represents —H or a methyl group, and $R_5$ represents —H or $R_6$ ($R_6$ represents a linear or branched $C_1$–$C_{20}$ alkyl group or a linear or branched $C_1$–$C_{20}$ alkoxycarbonyl group, and may have asymmetric carbon when branched).

Examples of the mesogen groups usable for the linear or cyclic liquid crystal oligomers of the recurring units (I) are shown in Tables 1 and 2.

In Table 1, number 1, for example, in the column of "Spacer" indicates that in the recurring unit (I), —$Ar_1$—R is

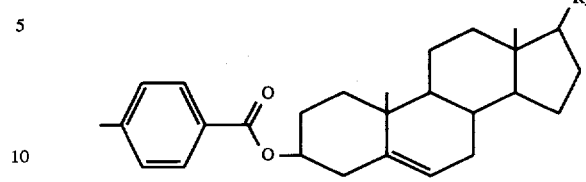

$R_3$ is

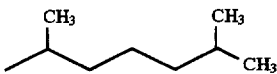

and the spacer —$(CH_2)_k$—$(O)_m$— is —$(CH_2)_3$— group (corresponding to the case of k=3 and m=0 in the formula (I)). Other numbers in the respective tables have the similar representations.

TABLE 1
| Ar₁—R | R₃ | Spacer | | | | | |
|---|---|---|---|---|---|---|---|
| | | —(CH₂)₃— | —(CH₂)₄— | —(CH₂)₅— | —(CH₂)₃O— | —(CH₂)₄O— | —(CH₂)₅O— |
| | | 1 | 2 | 3 | 4 | 5 | 6 |
| 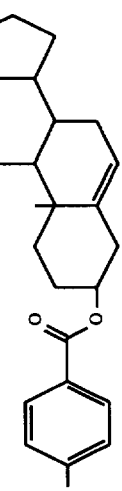 | 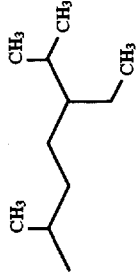 | 7 | 8 | 9 | 10 | 11 | 12 |
| " | 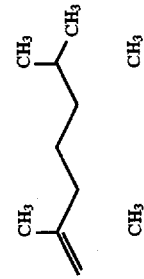 | 13 | 14 | 15 | 16 | 17 | 18 |
| " | 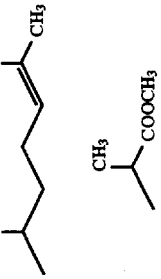 | 19 | 20 | 21 | 22 | 23 | 24 |
| " |  | 25 | 26 | 27 | 28 | 29 | 30 |

TABLE 2

| Ar₁—R | R₃ | Spacer | | | | | |
|---|---|---|---|---|---|---|---|
| | | —(CH₂)₃— | —(CH₂)₄— | —(CH₂)₅— | —(CH₂)₃O— | —(CH₂)₄O— | —(CH₂)₅O— |
| [steroid with benzoate ester] | [CH₃-CH(CH₃)-...-CH(CH₃)-CH₃ isooctyl chain] | 31 | 32 | 33 | 34 | 35 | 39 |
| " | [branched chain with CH₃, CH₃, CH₃] | 37 | 38 | 39 | 40 | 41 | 42 |
| " | [chain with terminal =CH₂] | 43 | 44 | 45 | 46 | 47 | 48 |
| " | [chain with internal C=C, CH₃] | 49 | 50 | 51 | 52 | 53 | 54 |
| " | [CH₃, COOCH₃ branched] | 55 | 56 | 57 | 58 | 59 | 60 |

Among these recurring unit structures, those of Nos.1–6 and 31–36 are preferred.

Examples of the divalent groups L' connecting $Ar_2$ and $Ar_3$ in the recurring unit (II) are —$CH_2$—O—, —O—$CH_2$—, —COO—, —OCO—, —$CH_2$—$CH_2$—, —CH=N—, —N=CH—, a group represented by the formula:

and a group in which $Ar_2$ and $Ar_3$ are directly bonded (corresponding to the case of p'=0 in the formula (II)).

Preferably the connecting group L' is —$CH_2$—$CH_2$—, —COO— or —OCO—, more preferably —COO— group.

The terminal group of the recurring unit (II) is a group for fixing orientation of the liquid crystal oligomer by polymerization. Polymerizable groups usable in this invention are those of the formula —OCO—C(R')=$CH_2$ (R' is hydrogen or $C_1$–$C_5$ alkyl group), which include acrylate groups and methacrylate groups. The polymerization method of these groups is not specified, but usually photopolymerization or thermal polymerization using a radical polymerization initiator is employed. Photopolymerization is preferred for simplicity of operation and high orientation fixing efficiency. Known photopolymerization initiators can be used.

Examples of the polymerizable mesogen groups usable for the linear or cyclic liquid crystal oligomers composed of the recurring units (II) are shown in Tables 3 and 4.

TABLE 3

| $-Ar_2-(L')_{p'}-Ar_3-$ | R' | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
|  | —H | 61 | 62 | 63 | 64 | 65 | 66 |
| " | —$CH_3$ | 67 | 68 | 69 | 70 | 71 | 72 |
| 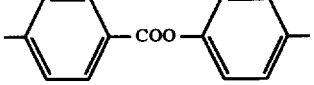 | —H | 73 | 74 | 75 | 76 | 77 | 78 |
| " | —$CH_3$ | 79 | 80 | 81 | 82 | 83 | 84 |
| 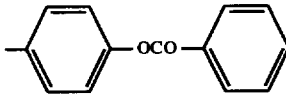 | —H | 85 | 86 | 87 | 88 | 89 | 90 |
| " | —$CH_3$ | 91 | 92 | 93 | 94 | 95 | 96 |
| 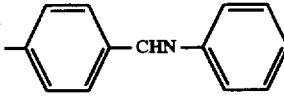 | —H | 97 | 98 | 99 | 100 | 101 | 102 |
| " | —$CH_3$ | 103 | 104 | 105 | 106 | 107 | 108 |

TABLE 4

| $-Ar_2-(L')_{p'}-Ar_3-$ | R' | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
| 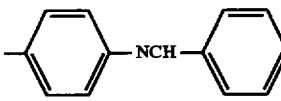 | —H | 109 | 110 | 111 | 112 | 113 | 114 |
| " | —$CH_3$ | 115 | 116 | 117 | 118 | 119 | 120 |
| 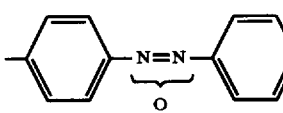 | —H | 121 | 122 | 123 | 124 | 125 | 126 |
| " | —$CH_3$ | 127 | 128 | 129 | 130 | 131 | 132 |

TABLE 4-continued

| $-Ar_2-(L')_{y'}-Ar_3-$ | R' | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
| 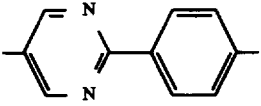 | —H | 133 | 134 | 135 | 136 | 137 | 138 |
| " | —CH$_3$ | 139 | 140 | 141 | 142 | 143 | 144 |
| 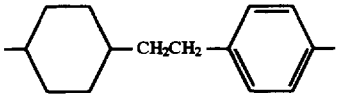 | —H | 145 | 146 | 147 | 148 | 149 | 150 |
| " | —CH$_3$ | 151 | 152 | 153 | 154 | 155 | 156 |

Among these polymerizable mesogen groups, those of Nos. 67–72, 79–84, 91–96, 139–144 and 151–156 are preferred. Those of Nos. 79–84 are especially preferred. Of these mesogen groups, those bonded to the linear or cyclic polysiloxane-based backbone are preferred for high orientation performance. Those bonded to the cyclic polysiloxane backbone are most preferred.

In the optically anisotropic film of the present invention, in case it has negative anisotropy of refractive index which is effectual for compensating viewing angle dependence of contrast or display color of TN cell due to refractive anisotropy of the liquid crystal molecules in a wide temperature range, it is necessary to adjust the helical pitch length of the cholesteric phase of the liquid crystal composition to 0.3 μm or less or to 0.8 μm or more in order to avoid selective reflection of visible light.

For improving contrast by compensating optical rotatory dispersion due to the twisted structure of the liquid crystal cell, the twist angle of twisted nematic alignment of the film must be adjusted to stay in a range of 70°–300°. For obtaining a film having such a twist angle, it is recommended to adjust the helical pitch length of the cholesteric phase of the liquid crystal composition to a range of 0.2–50 μm, preferably 1–35 μm, more preferably 2–20 μm. When the helical pitch length of the cholesteric phase is small, it is necessary to reduce the film thickness for adjusting the twist angle of twisted nematic alignment to be in a range of 70°–300°, which makes it hard to obtain a desired retardation. When the pitch length is large, it needs to increase the film thickness for realizing a required twist angle, which poses an economical problem.

The helical pitch length of the cholesteric phase of the liquid crystal composition can be controlled by adjusting the mesogen group structure of the liquid crystal oligomer (A) or by changing the recurring unit (I)/(II) ratio.

For the synthesis of the liquid crystal oligomers (A), the methods disclosed in U.S. Pat. Nos. 4,410,570, 4,358,391 and 5,211,877 can be employed. More specifically, there can be used a method in which said side chain mesogen group is added to the polysiloxane backbone, or a method in which an acrylic acid ester or methacrylic acid ester having a mesogen group through a flexible spacer is polymerized.

In case of adding mesogen group to the polysiloxane backbone, the reacting material having the same structure as the side chain mesogen group of the recurring units (I) and (II) and having ω-alkenyloxy group producing an alkyleneoxy group (spacer) and having unsaturated double bond at the terminal is reacted with polysiloxane in the presence of a platinum catalyst. In this reaction, it is possible to control the bonding ratio of the two types of mesogen groups, i.e., non-polymerizable mesogen groups and polymerizable mesogen groups, by adjusting the feed rate of the reacting material relative to said mesogen groups. Similarly, for those oligomers in which the backbone is an acrylic acid ester or an α-alkylacrylic acid ester, the ratio of the polymerizable mesogen groups to the non-polymerizable mesogen groups can be controlled by adjusting the monomer feed rate when two types of monomers having the corresponding mesogen groups are copolymerized.

The liquid crystal oligomer obtained in the manner described above is preferably one which shows a cholesteric phase.

Another method of controlling the helical pitch length of the liquid crystal composition comprises mixing in the liquid crystal oligomer (A) other types of liquid crystal oligomer or a low-molecular weight compound. As the other types of liquid crystal oligomer to be mixed with the oligomer (A), there can be used, in addition to those selected from the liquid crystal oligomers (A), the liquid crystal oligomers (B) having the recurring units (V) and (VI) as main structural units.

The side chain type liquid crystal oligomer used in the present invention needs to be oriented so that it will have anisotropy of refractive index, and in this case the number of the recurring units of the liquid crystal oligomer (B) becomes a key factor in facilitating the orienting operation. When the number of the recurring units is large, viscosity of the oligomer and its liquid crystal transition temperature are high, necessitating a high temperature and a long time for effecting desired orientation. When the number of the recurring units is small, orientation may be relaxed under a room temperature condition. The numbers n" and n'" of the recurring units (V) and (VI) are each independently an integer of 0 to 20, and they are selected so that n"+n'"=4 to 21. The n"/n'" ratio may be properly selected and can be adjusted when synthesizing the liquid crystal oligomer.

The liquid crystal transition temperature and orientation characteristics of the side chain type liquid crystal oligomer (B) are also affected by the spacer connecting the mesogen group to the backbone. Too short a spacer deteriorates the orientation characteristics of mesogen group while too long a spacer tends to cause relaxation of orientation. Therefore, as spacer, alkylene group or alkyleneoxy group with a carbon number of 2 to 10 is preferred. $C_2$–$C_6$ alkylene or alkyleneoxy group is especially preferred because of easier orientation. For facilitation of synthesis, alkyleneoxy group is more preferred. Typical examples of the preferred groups are
—$(CH_2)_2$—, —$(CH_2)_3$—, —$(CH_2)_4$—, —$(CH_2)_5$—,
—$(CH_2)_6$—, —$(CH_2)_3$—O—, —$(CH_2)_4$—O—, —$(CH_2)_5$—O—and —$(CH_2)_6$—O—.

For maximizing anisotropy of refractive index of the obtained optically anisotropic film, mesogen group of the liquid crystal oligomer (B) is preferably one which has large anisotropy of refractiver index. The structures which can provide such mesogen group include those of the oligomers composed of the recurring units (V) and (VI) wherein $Ar_2$, $Ar_3$, $Ar_4$ and $Ar_5$ represent independently 1,4-phenylene group, 1,4-cyclohexylene group, pyridine-2,5-diyl group or pyrimidine-2,5-diyl group. Preferably they represent independently, 4-phenylene group, pyridine-2,5-diyl group or pyrimidine-2,5-diyl group, most preferably 1,4-phenylene group.

The divalent groups L' and L" connecting $Ar_2$–$Ar_3$ and $Ar_4$–$Ar_5$ in the formulae of recurring units (V) and (VI) include —$CH_2$—O—, —O—$CH_2$—, —COO—, —OCO—, —$CH_2$—$CH_2$—, —CH=N—, —N=CH—, the groups represented by the formula:

$$-N=N-\underbrace{\phantom{XXX}}_{O}-$$

and the groups in which $Ar_2$ and $Ar_3$ or $Ar_4$ and $Ar_5$ are directly bonded. Preferably the connecting groups L' and L" are independently —$CH_2$—$CH_2$—, —COO—or —OCO—, more preferably —COO— group.

The group R" in the recurring unit (V) influences dielectric anisotropy and orientation performance of mesogen group, so that R" is selected from halogen, cyano group, $C_1$–$C_{10}$ alkyl group, $C_1$–$C_{10}$ alkoxy group, $C_6$–$C_{10}$ aryl group and benzoyloxy group having $C_1$–$C_{10}$ alkyl group or $C_1$–$C_{10}$ alkoxy group, preferably cyano group, $C_1$–$C_{10}$ alkyl group and $C_1$–$C_{10}$ alkoxy group, more preferably cyano group, for obtaining a liquid crystal oligomer film with high anisotropy of refractive index.

Examples of the mesogen groups usable for the linear or cyclic liquid crystal oligomers having the recurring units (V) are shown in Tables 5, 6, 7 and 8.

TABLE 5

| —$Ar_4$—(L")$_{p'}$—$Ar_5$— | R" | Spacer | | | | | |
|---|---|---|---|---|---|---|---|
| | | —$(CH_2)_3$— | —$(CH_2)_4$— | —$(CH_2)_5$— | —$(CH_2)_3O$— | —$(CH_2)_4O$— | —$(CH_2)_5O$— |
| biphenylene | —CN | 157 | 158 | 159 | 160 | 161 | 162 |
| " | —$OCH_3$ | 163 | 164 | 165 | 166 | 167 | 168 |
| " | —$OC_2H_5$ | 169 | 170 | 171 | 172 | 173 | 174 |
| " | —$C_6H_{13}$ | 175 | 176 | 177 | 178 | 179 | 180 |
| " | —$CH_3$ | 181 | 182 | 183 | 184 | 185 | 186 |
| phenylene-COO-phenylene | —CN | 187 | 188 | 189 | 190 | 191 | 192 |
| " | —$OCH_3$ | 193 | 194 | 195 | 196 | 197 | 198 |
| " | —$OC_2H_5$ | 199 | 200 | 201 | 202 | 203 | 204 |
| " | —$C_6H_{13}$ | 205 | 206 | 207 | 208 | 209 | 210 |
| " | —$CH_3$ | 211 | 212 | 213 | 214 | 215 | 216 |

TABLE 6

| —$Ar_4$—(L")$_{p'}$—$Ar_5$— | R" | Spacer | | | | | |
|---|---|---|---|---|---|---|---|
| | | —$(CH_2)_3$— | —$(CH_2)_4$— | —$(CH_2)_5$— | —$(CH_2)_3O$— | —$(CH_2)_4O$— | —$(CH_2)_5O$— |
| phenylene-OCO-phenylene | —CN | 217 | 218 | 219 | 220 | 221 | 222 |

TABLE 6-continued
| $-Ar_4-(L'')_p-Ar_5-$ | R'' | Spacer | | | | | |
|---|---|---|---|---|---|---|---|
| | | $-(CH_2)_3-$ | $-(CH_2)_4-$ | $-(CH_2)_5-$ | $-(CH_2)_3O-$ | $-(CH_2)_4O-$ | $-(CH_2)_5O-$ |
| " | $-OCH_3$ | 223 | 224 | 225 | 226 | 227 | 228 |
| " | $-OC_2H_5$ | 229 | 230 | 231 | 232 | 233 | 234 |
| " | $-C_6H_{13}$ | 235 | 236 | 237 | 238 | 239 | 240 |
| " | $-CH_3$ | 241 | 242 | 243 | 244 | 245 | 246 |
| 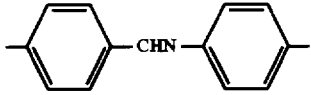 | $-CN$ | 247 | 248 | 249 | 250 | 251 | 252 |
| " | $-OCH_3$ | 253 | 254 | 255 | 256 | 257 | 258 |
| " | $-OC_2H_5$ | 259 | 260 | 261 | 262 | 263 | 264 |
| " | $-C_6H_{13}$ | 265 | 266 | 267 | 268 | 269 | 270 |
| " | $-CH_3$ | 271 | 272 | 273 | 274 | 275 | 276 |
TABLE 7
| $-Ar_4-(L'')_p-Ar_5-$ | R'' | Spacer | | | | | |
|---|---|---|---|---|---|---|---|
| | | $-(CH_2)_3-$ | $-(CH_2)_4-$ | $-(CH_2)_5-$ | $-(CH_2)_3O-$ | $-(CH_2)_4O-$ | $-(CH_2)_5O-$ |
| 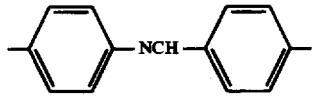 | $-CN$ | 277 | 278 | 279 | 280 | 281 | 282 |
| " | $-OCH_3$ | 283 | 284 | 285 | 286 | 287 | 288 |
| " | $-OC_2H_5$ | 289 | 290 | 291 | 292 | 293 | 294 |
| " | $-C_6H_{13}$ | 295 | 296 | 297 | 298 | 299 | 300 |
| " | $-CH_3$ | 301 | 302 | 303 | 304 | 305 | 306 |
| 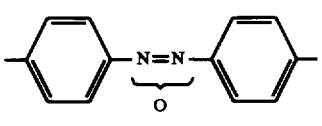 | $-CN$ | 307 | 308 | 309 | 310 | 311 | 312 |
| " | $-OCH_3$ | 213 | 314 | 315 | 316 | 317 | 318 |
| " | $-OC_2H_5$ | 319 | 320 | 321 | 322 | 323 | 324 |
| " | $-C_6H_{13}$ | 325 | 326 | 327 | 328 | 329 | 330 |
| " | $-CH_3$ | 331 | 332 | 333 | 334 | 335 | 336 |

TABLE 8

| −Ar₄−(L")ₚ−Ar₅− | R" | −(CH₂)₃− | −(CH₂)₄− | −(CH₂)₅− | −(CH₂)₃O− | −(CH₂)₄O− | −(CH₂)₅O− |
|---|---|---|---|---|---|---|---|
| pyridine-phenyl | −CN | 337 | 338 | 339 | 340 | 341 | 342 |
| " | −OCH₃ | 343 | 344 | 345 | 346 | 347 | 348 |
| " | −OC₂H₅ | 349 | 350 | 351 | 352 | 353 | 354 |
| " | −C₆H₁₃ | 355 | 356 | 357 | 358 | 359 | 360 |
| " | −CH₃ | 361 | 362 | 363 | 364 | 365 | 366 |
| cyclohexyl-CH₂CH₂-phenyl | −CN | 367 | 368 | 369 | 370 | 371 | 372 |
| " | −OCH₃ | 373 | 374 | 375 | 376 | 377 | 378 |
| " | −OC₂H₅ | 379 | 380 | 381 | 382 | 383 | 384 |
| " | −C₆H₁₃ | 385 | 386 | 387 | 388 | 389 | 390 |
| " | −CH₃ | 391 | 392 | 393 | 394 | 395 | 396 |

Among these mesogen groups, those of Nos. 157–162, 187–192, 217–222, 337–342 and 367–372 having cyano group are preferred. Those of Nos. 187–192 are especially preferred. Of these mesogen groups, those bonded to the polysiloxane-based backbone are preferred for high orientation performance. Those bonded to the cyclic siloxane backbone are most preferred.

The terminal group of the recurring unit (VI) is a group for fixing orientation of the liquid crystal oligomer by polymerization. Polymerizable groups usable in this invention are those of the formula —OCO—C(R')=CH₂ (R' is hydrogen or $C_1$–$C_5$ alkyl group), which include acrylate groups and methacrylate groups. The polymerization method of these groups is not specified, but usually photopolymerization or thermal polymerization using a radical polymerization initiator is employed. Photopolymerization is preferred for ease of operation and high orientation fixing efficiency. Known photopolymerization initiators can be used.

As the polymerizable mesogen groups used for the linear or cyclic liquid crystal oligomers having the recurring units (VI), those shown in Tables 3 and 4 can be employed.

Among the polymerizable mesogen groups shown in Tables 3 and 4, those of Nos. 67–72, 79–84, 91–96, 139–144 and 151–156 having methacrylate group are preferred, and those of Nos. 79–84 are especially preferred. Of these mesogen groups, those bonded to the linear or cyclic polysiloxane-based backbone are preferred as they give good properties to the subject oligomers, and those bonded to the cyclic polysiloxane backbone are especially preferred.

For the synthesis of these liquid crystal oligomers (B), there can be employed the same methods as used for the synthesis of liquid crystal oligomers (A) mentioned above.

The liquid crystal oligomer (B) obtained in the manner described above is preferably one which shows the nematic phase. In case the helical pitch length of the cholesteric phase is controlled by mixing a low-molecular weight compound with the liquid crystal oligomer (A) or a mixture of liquid crystal oligomers (A) and (B), the liquid crystal composition is polymerized after orientation, so that compatibility after polymerization becomes an important factor for the successful production of said film. For this reason, the low-molecular weight compound used in this process is preferably one having a polymerizable group. It is also desirable that the polymerizable low-molecular weight compound to be added to the liquid crystal oligomer is of a structure which shows a liquid crystal phase for uniform mixing.

Some examples of the polymerizable low-molecular weight compounds usable in the present invention are shown below by structural formula. It should be noted that these compounds are shown merely for the purpose of exemplification and not intended to limit the compounds usable in this invention.

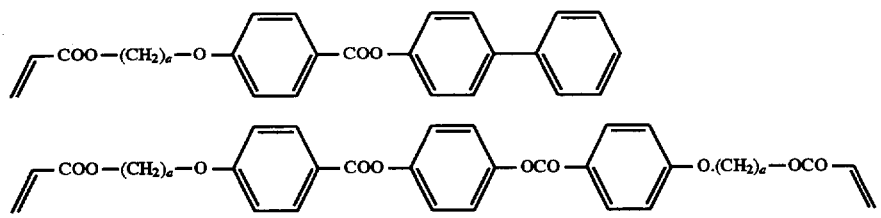

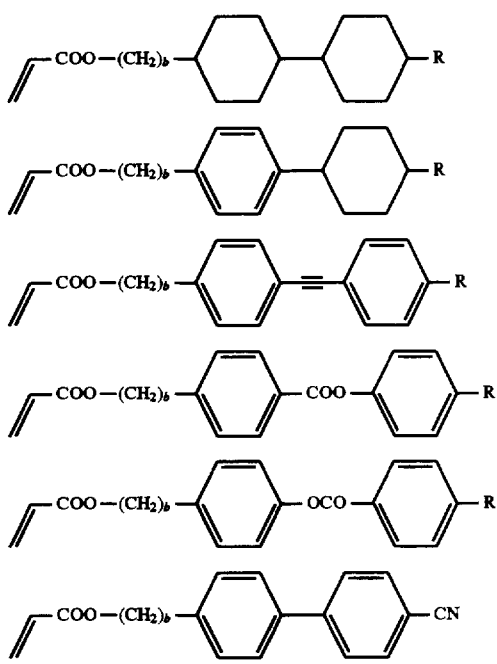

In the above formulae, a is an integer of 1 to 10, b is an integer of 0 to 10, and R is a linear or branched $C_1$–$C_{10}$ alkyl or alkoxy group. The group R may be optically active when branched.

The amount of the low-molecular weight compound added is preferably 0 to 50 wt%, more preferably 0 to 40 wt%, based on the liquid crystal composition. When the compound is added in excess of 50 wt%, film forming properties of the composition and/or orientation stability may be impaired.

The process for producing an optically anisotropic film according to the present invention comprises the steps of forming a film of a liquid crystal composition, heat treating the formed film so that the helical axis of twisted nematic alignment will become substantially parallel to the direction normal to the film plane, and then polymerizing the polymerizable group of low-molecular weight compound and/or liquid crystal oligomers (A) and/or (B). The method of forming a film of a liquid crystal composition is not critical in this invention, but usually a film is formed on a smooth substrate. The optically anisotropic film formed on the substrate may be peeled from the substrate and attached to another substrate or it may be used with the substrate attached thereto. The substrate used in the present invention is preferably transparent or semitransparent, and the usable substrates include inorganic substrates such as glass, and polymer films. Inorganic substrates include transparent or semitransparent glass plates, outer side of glass plate used for liquid crystal cell, and plates of inorganic compounds such as oxides or fluorides of Si, Al, Mg, Zr or the like, and ceramics.

Polymer films include the films of polycarbonates, polysulfone, polyarylates, polyether sulfone, cellulose diacetate, cellulose triacetate, polystyrene, ethylene-vinyl alcohol copolymer, polyethylene terephthalate, polyethylene naphthalate and the like. Of these polymers, polycarbonates, polyarylates, polysulfone, cellulose triacetate, polyethylene terephthalate and polystyrene are preferred.

Thickness of the polymer film used as substrate is not specified, but it is preferably 0.8–500 µm, more preferably 10–300 µm, even more preferably 40–200 µm.

For producing such a polymer film, various molding methods such as solvent casting, extrusion molding, press molding, etc., can be employed.

In case of using a polymer film as substrate, it is recommended to select appropriate one in consideration of the heat treatment temperature so as to avoid the troubles that tend to occur in carrying out the heat treatment of the liquid crystal oligomer described later, such as deformation of the substrate which may take place when the heat treatment temperature exceeds the glass transition temperature of the substrate used or the flow temperature of the substrate in case the substrate contains additives.

In production of the optically anisotropic film according to the present invention, the liquid crystal composition is oriented so that the helical axis of twisted nematic alignment will become substantially parallel to the direction normal to the film plane. For realizing such twisted nematic alignment, usually a horizontal alignment treatment is applied on the substrate surface.

Known methods such as rubbing or oblique evaporation can be applied for horizontal alignment treatment, rubbing being preferred for industrial practice of the treatment.

When rubbing is employed, the substrate with no liquid crystal oligomer film formed yet thereon is directly rubbed or rubbing is applied after an alignment layer has formed on the substrate. The latter method is preferred for stability of alignment.

Known materials capable of horizontally aligning the liquid crystal molecules, such as polyimides, polyamides and polyvinyl alcohol, can be used for forming the alignment layer.

The alignment layer can be formed by employing a suitable coating method such as roll coating, gravure coating, bar coating, spin coating, spray coating, printing, dipping, etc. As for the thickness of the alignment layer, usually the layer can perform its normal aligning function when its thickness is 0.01 µm or greater, but the layer workability is deteriorated when the layer is too thick, so that the layer thickness is preferably in a range of 0.01 to 5.0 µm, more preferably 0.02 to 3.0 µm.

The thus formed alignment layer is subjected to aftertreatments such as drying and curing according to the type of the layer and then rubbed. A known method can be employed for rubbing in this invention. For instance, in case of using a rubbing roller, no specific restrictions are imposed on the material of the roller, amount of penetration of the roller into the layer, moving rate of the roller relative to the substrate, frequency of rubbing, etc., and the optimal conditions can be selected in consideration of the type of the alignment layer, the type of the liquid crystal oligomer and other factors.

For oblique evaporation, there can be used, for instance, a method using an oblique deposit of an inorganic material. The inorganic material used in this method is preferably one which shows a prismatic or a columnar growth during evaporation. Examples of such inorganic materials include SiO, $SiO_2$, $SiO_x$ (1<x<2), MgO, $MgO_y$ (0<y<1), $MgF_2$, Pt, ZnO, $MoO_3$, $WO_3$, $Ta_2O_5$, $SnO_2$, $CeO_2$, $LiNbO_3$, $LiTaO_3$, $ZrO_2$, $Bi_2O_3$, $TiZrO_4$, $HfO_2$ and the like. Of these materials, SiO, $SiO_2$, SiOx (1<x<2), MgO, $MgO_y$ (0<y<1), $MgF_2$, Pt and ZnO are preferred, and SiO, $SiO_2$ and SiOx (1<x<2) are most preferred.

There are available various methods for oblique evaporation such as evaporation by resistance heating, evaporation by electron beam heating and sputtering. Of these methods, evaporation by electron beam heating and sputtering are preferred for evaporating a high-melting point inorganic material. The degree of vacuum for evaporation is not specified, but the upper limit pressure is decided in view of uniformity of the evaporation film while the lower limit pressure is decided in view of productivity. Specifically, the degree of vacuum used for evaporation is usually in a range of 1 Torr to $5 \times 10^{-6}$ Torr.

The evaporation rate of the inorganic material is preferably in a range of 0.01 to 10 nm/sec, more preferably 0.1 to 5 nm/sec, because an evaporation rate below the above-defined range leads to a poor productivity while an evaporation rate above said range is detrimental to uniformity of the evaporation film.

As for the thickness of the evaporated film of inorganic material, good alignment can not be obtained when the film thickness is thin and productivity is lowered when the film thickness is thick, so that the film thickness is usually in a range of 0.01 to 1,000 µm, preferably 0.05 to 100 µm, more preferably 0.1 to 5 µm.

Then a film of a liquid crystal composition is formed on the substrate which has undergone said horizontal alignment treatment. The film can be formed by coating a liquid crystal composition on the substrate in the state of solution or in the state of isotropic phase. Coating in the state of solution is preferred. Ordinary coating methods such as roll coating, gravure coating, bar coating, spin coating, spray coating, printing, dipping, etc., can be used.

Thickness of the liquid crystal composition film is preferably 0.1 to 20 µm, more preferably 0.5 to 10 µm, even more preferably 1 to 7 µm. When the film thickness is less than 0.1 µm, the film may fail to develop its optical properties to a satisfactory degree. A film thickness exceeding 20 µm is undesirable in economical terms.

The film thickness also needs to be set in consideration of the twist angle required for an optically anisotropic film and the helical pitch length of the liquid crystal composition used. In an optically anisotropic film having negative anisotropy of refractive index effective for compensating angle dependence of contrast or display color due to refractive anisotropy of the liquid crystal cell over a wide temperature range, it is desirable that the film thickness is more than 3 times, preferably more than 5 times, even more preferably more than 10 times the helical pitch length of cholesteric phase of the liquid crystal composition. When the film thickness is small, there may undesirably take place leakage of light in the case of placing a sample between orthogonally positioned polarizing plates due to optical rotation of the cholesteric orientation. This leads to a reduction of contrast when the film is adapted in a liquid crystal cell. In an optically anisotropic film designed to improve contrast by compensating optical rotatory dispersion due to the twisted structure of the STN liquid crystal cell, it is desirable to make the film thickness smaller than the cholesteric helical pitch.

Then a heat treatment of liquid crystal composition is carried out. This heat treatment is preferably conducted in a temperature range defined by $(Tg+30) \leq T_{heat} \leq (T_{soft}-30)$, preferably $(Tg+40) \leq T_{heat} \leq (T_{soft}-40)$ wherein $T_{heat}$ (° C.) is heat treatment temperature, Tg (° C.) is transition temperature from crystal phase or glass phase to liquid crystal phase of the liquid crystal composition, and $T_{soft}$ (° C.) is the temperature which causes deformation of the substrate or the alignment film. Specifically, the heat treatment is preferably carried out in a temperature range of 60°–200°C. in view of ease of the operation.

The period of heat treatment is also not critical, but since too short a time can not provide sufficient twisted nematic alignment while too long a time is unfavorable in economical terms, the heat treatment time is preferably 0.2 minutes to 20 hours, more preferably one minute to one hour.

The above heat treatment allows the liquid crystal composition to have twisted nematic alignment with the helical axis disposed parallel to the direction normal to the film plane. The heating and cooling rates in the heat treatment are not specified.

Next, the liquid crystal composition is polymerized for fixing twisted nematic alignment. As the polymerization method, since it is necessary to carry out polymerization while maintaining said alignment, photopolymerization, radiation polymerization using γ-rays, etc., or thermal polymerization is recommended. Known polymerization initiators can be used for photopolymerization and thermal polymerization. Of these polymerization methods, photopolymerization and thermal polymerization are preferred because of simple process, photopolymerization being most preferred for good retention of alignment.

The intensity of irradiation light applied for photopolymerization may be properly decided depending on the film thickness and the type of the liquid crystal oligomer used, but usually it is recommended to apply light of an intensity of 0.01 to 5.0 $J/cm^2$, preferably 0.1 to 3.0 $J/cm^2$. When the applied light intensity is below 0.01 $J/cm^2$, the reaction of the polymerizable group may be incomplete. Use of light with a higher intensity than 5.0 $J/cm^2$ poses an economical problem.

In a liquid crystal display device provided according to the present invention, at least one optically anisotropic film of the present invention, or a laminate of said optically anisotropic film and a substrate, is disposed between a liquid crystal cell comprising a liquid crystal layer held between a pair of substrates provided with electrodes, said liquid crystal layer including liquid crystal molecules having positive anisotropy of dielectric constant and oriented substantially horizontally with a helical axis aligned vertically to the substrate when no electrical voltage is applied, and at least one polarizing film disposed on either upper or lower outside, or both outsides of said cell. Examples of the liquid crystal cell comprising a liquid crystal layer oriented substantially horizontally with a helical axis aligned vertically to the substrate when no electrical voltage is applied, which can be adapted in a liquid crystal display device of the present invention, are a TN type liquid crystal cell with a twist angle of approximately 90° and an STN type liquid crystal cell with a twist angle of 180°–300°. The twist angle of the liquid crystal cell can be adjusted by the amount of the twisting agent added to the liquid crystal composition or by the alignment treatment of the upper and lower substrates. In the liquid crystal display device of the present invention, the way of disposition of the polarizing plate and the optically anisotropic film of the present invention is not specified, and they can be appropriately disposed according to the required product properties. Also, in the liquid display device of the present invention, said optically anisotropic film may be disposed on one side alone of the liquid crystal cell or on both sides thereof as far as the film is positioned between the polarizing plate and the liquid crystal cell.

In another liquid crystal display device provided according to the present invention, at least one optically anisotropic film of the present invention, or a laminate of said optically anisotropic film and a substrate, is disposed between a liquid crystal cell comprising a liquid crystal layer held between a pair of substrates provided with electrodes, said liquid crystal layer including liquid crystal molecules having positive anisotropy of dielectric constant and oriented substantially horizontally to the substrate when no electrical voltage is applied, and at least one polarizing film disposed on either upper or lower outside, or both outsides of said cell. Examples of the liquid crystal cell comprising a liquid crystal layer having positive anisotropy of dielectric constant and oriented substantially horizontally to the substrate when no electrical voltage is applied, which can be adapted in a liquid crystal device of the present invention. In the liquid crystal display device of the present invention, the way of disposition of the polarizing plate and the optically anisotropic film of the present invention is not specified, and they can be appropriately disposed in accordance with the required product properties. Also, in said liquid crystal display device, the optically anisotropic film may be provided on one side alone of the liquid crystal cell or on both sides thereof as far as the film is positioned between the polarizing plate and the liquid crystal cell.

In still another liquid crystal display device provided according to the present invention, at least one optically anisotropic film of the present invention, or a laminate of said optically anisotropic film and a substrate, is disposed between a liquid crystal cell comprising a liquid crystal layer held between a pair of substrates provided with electrodes, said liquid crystal layer including liquid crystal molecules having negative anisotropy of dielectric constant and oriented substantially vertically to the substrate when no electrical voltage is applied, and at least one polarizing film disposed on either upper or lower outside, or both outsides of said cell. The liquid crystal cell comprising a liquid crystal layer held between a pair of substrates provided with electrodes, having negative anisotropy of dielectric constant and oriented substantially vertically to the substrate when no electrical voltage is applied, which can be adapted in the liquid crystal display device of the present invention, can be produced by placing the liquid crystal composition between a pair of substrates which have been subjected to a vertical alignment treatment. In the liquid crystal display device of the present invention, the way of disposition of the polarizing film and the optically anisotropic film of the present invention is not specified, and they can be appropriately disposed according to the required product properties. Also, in said liquid crystal display device, said optically anisotropic film may be provided on one side alone of the liquid crystal cell or on both sides thereof as far as the film is positioned between the polarizing plate and the liquid crystal cell.

The present invention is explained in more detail in the following Examples; however, it should be recognized that the scope of the present invention is not restricted to these Examples.

The phase transition temperature of the liquid crystal oligomers was determined by polarization microscopical observation and measurement by a differential scanning calorimeter (DSC).

Negative anisotropy of refractive index of the obtained optically anisotropic film was confirmed by zero retardation in the plane vertical to the normal line of the film and increase of retardation with slanting of the film from the horizontal plane.

Retardation of the film was determined by Sénarmont's method using a polarization microscope with light of 546 nm.

The twist angle of the obtained optically anisotropic film was determined by applying linearly polarized light to the optically anisotropic film and determining the direction of oscillation of the emitted linearly polarized light (using MCPD-1000 mfd. by Otsuka Denshi KK). The phase difference [Δn·d (Δn is apparent anisotropy of refractive index of the film and d is film thickness)] of the optically anisotropic film was determined by analyzing the transmitted light spectrum obtained by using a cell gap measuring device (TFM-120AFT mfd. by Orc Seisakusho Ltd.).

EXAMPLE 1

A polyimide alignment layer was formed on a cleaned glass substrate by spin coating and heat treated at 200° C. for 3 hours. The formed alignment layer was approximately 0.02 μm thick. This alignment layer was rubbed by using a rubbing machine.

A 7:3 mixture of the vinyl monomers of the following formulae (1) and (2) was reacted with pentamethylcyclopentasiloxane in the same way as described in JP-B-63-41400 to obtain a cyclic pentasiloxane liquid crystal oligomer:

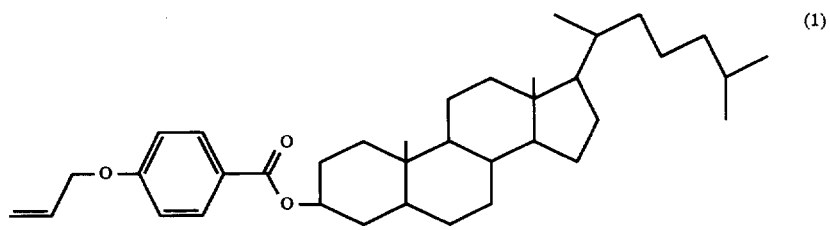

-continued

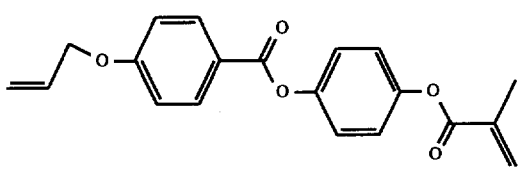

(2)

The glass transition temperature and the liquid crystal phase/isotropic phase transition temperature of the obtained liquid crystal oligomer were 14° C. and 114° C, respectively, and the oligomer showed a cholesteric phase in the temperature range of 14-114C. As a result of extrapolation from the measured value of selective reflection wavelength of the composition consisting of said liquid crystal oligomer and nematic liquid crystal, the selective reflection wavelength of the liquid crystal oligomer alone was determined to be 280 nm. From this wavelength, the helical pitch of the cholesteric phase of said liquid crystal oligomer is given as 0.2 μm.

This liquid crystal oligomer was dissolved in toluene to a concentration of 40%, and then Irgacure 907 (produced by Ciba Geigy AG) was mixed in the solution as photopolymerization initiator in an amount of 2.0 wt% based on the liquid crystal oligomer. This solution was spin coated on a glass substrate having a polyimide alignment layer. The obtained liquid crystal oligomer film was cloudy and polarization microscopical observation thereof showed that the film was not aligned at all.

This liquid crystal oligomer film was heated at 80° C. for 5 minutes and then irradiated with ultraviolet light from a high pressure mercury lamp at a cumulative irradiation dose of 0.2 J/cm².

Thickness of the thus obtained polymerized liquid crystal oligomer film was 6 μm, which is 30 times the helical pitch of the cholesteric phase, and no tinting by selective reflection of the visible light was observed. This polymerized liquid crystal oligomer film became optically extinct when placed under crossed nicols, and retardation was almost zero. Retardation after a tilt of 50° was 46 nm.

EXAMPLE 2

A polyvinyl alcohol alignment layer was formed on a cleaned glass substrate by spin coating and heat treated at 100° C. for one hour. The obtained alignment layer was approximately 0.05 μm thick. This alignment layer was rubbed by using a rubbing machine.

A vinyl monomer of the following formula (3) was reacted with pentamethylcyclopentasiloxane in the same way as described in JP-B-63-41400 to obtain a cyclic pentasiloxane liquid crystal oligomer:

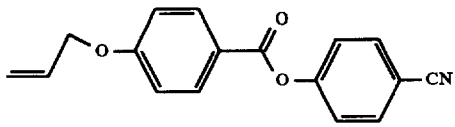

(3)

The obtained liquid crystal oligomer had a glass transition temperature of 20° C. and a liquid crystal phase/isotropic phase transition temperature of 97° C. and showed the nematic phase at 20°–97°C.

A 5:95 (by weight) mixture of this liquid crystal oligomer and the liquid crystal oligomer used in Example 1 was dissolved in toluene to a solid concentration of 30 wt%, and then Irgacure 907 (produced by Ciba Geigy AG) was mixed in the solution as photopolymerization initiator in an amount of 2.0 wt% based on the liquid crystal oligomer. This solution was spin coated on a glass substrate having a polyvinyl alcohol alignment layer.

Polarization microscopical observation of the obtained liquid crystal oligomer confirmed that the film had the cholesteric phase. Also, this liquid crystal oligomer film was cloudy, and when observed under a polarization microscope, it was found that the film was not aligned at all.

This liquid crystal oligomer film was gradually cooled from the temperature at which the film assumed the isotropic phase, and after alignment, the film was irradiated with ultraviolet light from a high pressure mercury lamp at a cumulative irradiation dose of 0.2 J/cm².

The obtained polymerized liquid crystal oligomer film was 3 μm thick, and no tinting by selective reflection of the visible light was observed. This polymerized liquid crystal oligomer film became optically extinct when placed under crossed nicols, and retardation was substantially zero. It showed retardation of 21 nm when tilted 50°.

EXAMPLE 3

A polyvinyl alcohol alignment layer was formed on a cleaned glass substrate by spin coating and heat treated at 100° C. for one hour. The obtained alignment layer was approximately 0.05 μm thick. This alignment layer was rubbed by a rubbing machine.

A 1:1 mixture of the vinyl monomer (2) used in Example 1 and the vinyl monomer (3) used in Example 2 was reacted with pentamethylcyclopentasiloxane in the same manner as described in JP-B-63-41400 to obtain a cyclic pentasiloxane liquid crystal oligomer.

The glass transition temperature and the liquid crystal phase/isotropic phase transition temperature of this liquid crystal oligomer were 19° C. and 118° C., respectively, and it showed the smectic phase at 19°–118° C.

A 10:90 (by weight) mixture of this liquid crystal oligomer and the liquid crystal oligomer used in Example 1 was dissolved in toluene to a solid concentration of 30 wt%, and then Irgacure 907 (produced by Ciba Geigy AG) was mixed in the solution as photopolymerization initiator in an amount of 2.0 wt% based on the liquid crystal oligomer. This solution was spin coated on a glass substrate having a polyvinyl alcohol alignment layer.

Polarization microscopical observation of the obtained liquid crystal oligomer film confirmed cholesteric phase of the film. Also, this liquid crystal oligomer film was cloudy, and when observed under a polarization microscope, the film was found not aligned at all.

Then this liquid crystal oligomer film was gradually cooled from the temperature at which the film assumed isotropic phase, and after alignment, the film was irradiated with ultraviolet light from a high pressure mercury lamp at a cumulative irradiation dose of 0.2 J/cm².

The obtained polymerized liquid crystal oligomer film was 4 μm thick, and no tinting by selective reflection of the visible light was observed. This polymerized liquid crystal oligomer film became optically extinct when placed under crossed nicols, and retardation was substantially zero. The film showed retardation of 15 nm when tilted 50°.

A TN liquid crystal panel with small viewing angle dependence of contrast can be obtained by placing an optically anisotropic film obtained in Examples 1–3 between a TN liquid crystal cell and a polarizing film.

EXAMPLE 4

A polyvinyl alcohol alignment layer was formed on a cleaned glass substrate by spin coating and heat treated at 100° C. for one hour. Thickness of the obtained alignment layer was approximately 0.05 μm. This alignment layer was rubbed by a rubbing machine.

A 3:97 (by weight) mixture of the cyclic pentasiloxane liquid crystal oligomer (A) obtained in Example 1 and the cyclic pentasiloxane liquid crystal oligomer (B) obtained in Example 2 was dissolved in toluene to a solid concentration of 30 wt%, and then Irgacure 907 (produced by Ciba Geigy AG) was mixed in the solution as photopolymerization initiator in an amount of 2.0 wt% based on the liquid crystal oligomer. This solution was spin coated on a glass substrate having a polyvinyl alcohol alignment layer.

Polarization microscopical observation of the obtained liquid crystal oligomer film confirmed that the film assumed cholesteric phase. Also, this liquid crystal oligomer film was cloudy, and when observed under a polarization microscope, the film was not aligned at all.

This liquid crystal oligomer film was heated to the temperature at which the film assumed isotropic phase, and then gradually cooled for alignment. Thereafter, the film was irradiated with ultraviolet light from a high pressure mercury lamp at a cumulative irradiation dose of 0.2 J/cm$^2$.

Thickness of the obtained polymerized liquid crystal oligomer film was 3.0 m, its twist angle was 243°, and Δn·d at room temperature was 0.748 μm.

Δn·d of this optically anisotropic film measured at 55° C. was 0.646 μm, which was 86% of that at room temperature.

EXAMPLE 5

The procedure of Example 4 was carried out except that the liquid crystal oligomer (A) : (B) mixing ratio (by weight) was changed to 4:96 to produce a liquid crystal oligomer film. Thickness of the obtained polymerized liquid crystal oligomer film was 3.4 μm, its twist angle was 220° and Δn·d at room temperature was 0.980 μm.

Δn·d of the obtained optically anisotropic film at 55° C. was 0.906 μm, which was 92% of that at room temperature.

Comparative Example 1

Temperature dependency of Δn·d of a uniaxially oriented retardation film having the optical axis in the film plane and composed of a polycarbonate having positive anisotropy of refractive index (Sumikalight SEF-400426 mfd. by Sumitomo Chemical Co., Ltd.; Δn·d=380 nm; viewing angle: 39°) was measured. There was observed substantially no change between Δn·d at room temperature and that at 55° C.

EXAMPLE 6

The procedure of Example 4 was followed except the liquid crystal oligomer (A):(B) ratio (by weight) was changed to 5:95 to obtain a liquid crystal oligomer film. Thickness of the obtained polymerized liquid crystal oligomer film was 2.8 μm, its twist angle was 213° and Δn·d at room temperature was 0.925 μm.

An STN liquid crystal cell having excellent viewing angle characteristics and contrast can be obtained by placing said polymerized liquid crystal oligomer film between an STN liquid crystal cell and a polarizing plate.

Since temperature dependence of Δn·d of this optically anisotropic film is similar to that of STN liquid crystal cell, it is possible to improve the viewing angle characteristics and contrast at high temperatures.

According to the present invention, it is possible to obtain a retardation plate having a wide viewing angle by using an optically anisotropic film having negative anisotropy of refractive index or twisted nematic alignment.

Also, by applying this retardation plate to TN type or STN type liquid crystal displays, it is possible to markedly improve the display characteristics, especially viewing angle characteristics, of the liquid crystal display devices. Further, in the optically anisotropic film of the present invention, because of similarity to liquid crystal panel in temperature dependence of refractive anisotropy, it is possible to improve the viewing angle characteristics of the liquid crystal cell over a wide temperature range.

What is claimed is:

1. An optically anisotropic film comprising a liquid crystal composition having twisted nematic alignment, characterized in that the helical axis of twisted nematic alignment is substantially parallel to the direction normal to the film plane, and said liquid crystal composition shows a colesteric phase and contains at least one liquid crystal oligomer selected from the linear or cyclic liquid crystal oligomers (A) having the following recurring units (I) and (II) as main structural units, wherein when the numbers of the recurring units (I) and (II) in one molecule of the liquid crystal oligomer (A) are supposed to be n and n', respectively, n and n' are each independently an integer of 1 to 20 and satisfy the relations of 4≦n+n'≦21 and n: n'=20:1 to 1:20, and the terminal group of the recurring unit (II) of the liquid crystal oligomer (A) is polymerized:

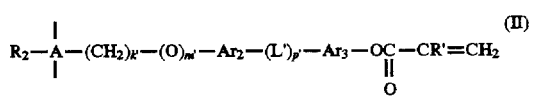

wherein A is a group represented by the following formula (III) or (IV):

wherein in the formula (III), —Si—O— is a main chain of the recurring unit (I) or (II) and, in the formula (IV), —C—CH$_2$— is a main chain of the recurring unit (I) or (II) and COO group is positioned in the side chain which is not R$_1$ or R$_2$; when A in the formula (i) is the formula (III) and when A in the formula (II) is the formula (III), $R_1$ and $R_2$ are independently hydrogen, an alkyl group having 1 to 6 carbon atoms or a phenyl group, and when A in the formula (I) is the formula (IV) and when A in the formula (II) is the formula (IV), $R_1$ and $R_2$ are independently hydrogen or an alkyl group having 1 to 6 carbon atoms; k and k' are independently an integer of 2 to 10; m and m' are independently 0 or 1; $Ar_1$, $Ar_2$ and $Ar_3$ are independently a 1,4-phenylene group, a 1,4-cyclohexylene group, a pyridine-2,5-diyl group or a pyrimidine-2,5-diyl group; L' is —$CH_2$—O—, —O—$CH_2$—, —COO—, —OCO—, —$CH_2$—$CH_2$—, —CH=N—, —N=CH— or a divalent group represented by the formula:

p' is independently 0 or 1; R is an optically active group; and R' is hydrogen or an alkyl group having 1 to 5 carbon atoms.

2. An optically anisotropic film according to claim 1, wherein the liquid crystal composition showing a cholesteric phase is defined by the fact that when the thickness of the optically anisotropic film is represented by d (μm) and the helical pitch of the cholesteric phase is represented by P (μm), $d \geq 3 \times P$ and $P \leq 0.3$ μm or $P \geq 0.8$ μm.

3. An optically anisotropic film according to claim 1, wherein the twist angle of twisted nematic alignment of the liquid crystal composition showing a cholesteric phase falls in a range of 70°–300°, and said liquid crystal composition shows a cholesteric phase with a helical pitch of 0.2–50 μm.

4. An optically anisotropic film comprising a liquid crystal composition having twisted nematic alignment, characterized in that the helical axis of twisted nematic alignment is substantially parallel to the direction normal to the film plane; said liquid crystal composition shows a cholesteric phase and contains at least one liquid crystal oligomer selected from the liquid crystal oligomers (A) set forth in claim 1 and at least one low-molecular weight compound having a polymerizable group; and the terminal group of the recurring unit (II) of the liquid crystal oligomer (A) and/or the low-molecular weight compound having a polymerizable group are polymerized.

5. An optically anisotropic film according to claim 4, wherein the liquid crystal composition showing a cholesteric phase is defined by the fact that when the thickness of the optically anisotropic film is represented by d (μm) and the helical pitch of the cholesteric phase is represented by P (μm), $d \geq 3 \times P$ and $P \leq 0.3$ μm or $P \geq 0.8$ μm.

6. An optically anisotropic film according to claim 4, wherein the twist angle of twisted nematic alignment of the liquid crystal composition showing a cholesteric phase falls in a range of 70°–300°, and said liquid crystal composition shows a cholesteric phase with a helical pitch of 0.2–50 μm.

7. An optically anisotropic film comprising a liquid crystal composition having twisted nematic alignment, characterized in that the helical axis of twisted nematic alignment is substantially parallel to the direction normal to the film plane, and said liquid crystal composition shows a cholesteric phase and contains at least one liquid crystal oligomer selected from the liquid crystal oligomers (A) set forth in claim 1 and at least one liquid crystal oligomer selected from the liquid crystal oligomers (B) other than (A), said liquid crystal oligomers (B) being selected from the linear or cyclic liquid crystal oligomers having the following recurring units (V) and (VI) as main structural units, wherein when the numbers of the recurring units (V) and (VI) in one molecule of the liquid crystal oligomer (B) are supposed to be n" and n'", respectively, n" and n'" are independently an integer of 0 to 20 and defined by the relation of $4 \leq n''+n''' \leq 21$, and the terminal group of the recurring unit (II) of the liquid crystal oligomer (A) and/or the terminal group of the recurring unit (VI) of the liquid crystal oligomer (B) are polymerized:

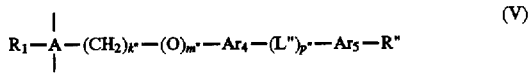

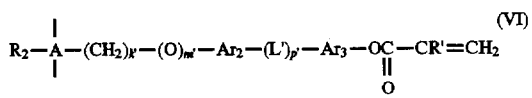

wherein A, $R_1$, $R_2$, k',m', p', L'$Ar_2$ $Ar_3$, and R' are as defined above; k" is an integer of 2 to 10; m" is 0 or 1; $Ar_4$ and $Ar_5$ are independently a 1,4-phenylene group, a 1,4-cyclohexylene group, a pyridine-2,5-diyl group or a pyrimidine-2,5-diyl group; L" is —$CH_2$—O—, —O—$CH_2$—, —COO—, —OCO—, —$CH_2$—$CH_2$—CH=N—, —N=CH— or a divalent group represented by the formula:

p" is 0 or 1; and R" is a halogen, a cyano group, a $C_1$–$C_{10}$ alkyl group, a $C_1$–$C_{10}$ alkoxyl group, a $C_6$–$C_{10}$ aryl group, or a benzoyloxy group having a $C_1$–$C_{10}$ alkyl group or a $C_1$–$C_{10}$ alkoxyl group.

8. An optically anisotropic film according to claim 7, wherein the liquid crystal composition showing a cholesteric phase is defined by the fact that when the thickness of the optically anisotropic film is represented by d (μm) and the helical pitch of the cholesteric phase is represented by P (μm), $d \geq 3 \times P$ and $P \leq 0.3$ μm or $P \geq 0.8$ μm.

9. An optically anisotropic film according to claim 7, wherein the twist angle of twisted nematic alignment of the liquid crystal composition showing a cholesteric phase falls in a range of 70°–300°, and the helical pitch of said liquid crystal composition is 0.2–50 μm.

10. An optically anisotropic film comprising a liquid crystal composition having twisted nematic alignment, characterized in that the helical axis of twisted nematic alignment is substantially parallel to the direction normal to the film plane; said liquid crystal composition shows a cholesteric phase and contains at least one liquid crystal oligomer selected from the liquid crystal oligomers (A) set forth in claim 1, at least one liquid crystal oligomer selected from the liquid crystal oligomers (B) set forth in claim 7 and at least one low-molecular weight compound having a polymerizable group; and the terminal group of the recurring unit (II) of the liquid crystal oligomer (A) and/or the terminal group of the recurring unit (VI) of the liquid crystal oligomer (B) and/or the low-molecular weight compound having a polymerizable group are polymerized.

11. An optically anisotropic film according to claim 10, wherein the liquid crystal composition showing a cholesteric phase is defined by the fact that when the thickness of the optically anisotropic film is represented by d (μm) and the helical pitch of the cholesteric phase is represented by P (μm), $d \geq 3 \times P$ and $P \leq 0.3$ μm or $P \geq 0.8$ μm.

12. An optically anisotropic film according to claim 10, wherein the twist angle of twisted nematic alignment of the liquid crystal composition showing a cholesteric phase falls in a range of 70°–300°, and the helical pitch of said liquid crystal composition is 0.2–50 μm.

13. An optically anisotropic film according to claims 1, comprising a liquid crystal oligomer in which R is represented by the following formula (VII) or (VIII):

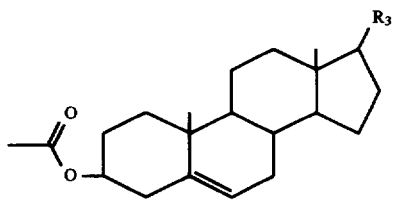

(VII)

wherein $R_3$ represents —H or the following formula (IX):

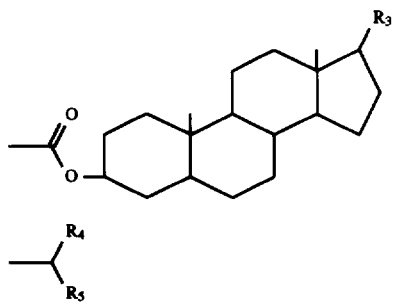

(VIII)

(IX)

wherein $R_4$ represents —H or a methyl group, and $R_5$ represents —H or $R_6$ wherein $R_6$ is a linear or branched $C_1$–$C_{20}$ alkyl group or a linear or branched $C_1$–$C_{20}$ alkoxycarbonyl group, and when branched, it optionally has asymmetric carbon.

14. A process for producing an optically anisotropic film which comprises forming a film of a liquid crystal composition set forth in claim 1, heat treating the film so that the helical axis of twisted nematic alignment will become substantially parallel to the direction normal to the film plane, and then polymerizing the polymerizable group of the low-molecular weight compound and/or polymerizable group of the liquid crystal oligomer (A) and/or polymerizable group of the liquid crystal oligomer (B).

15. A laminate comprising an optically anisotropic film set forth in claim 1 and a transparent or semitransparent substrate having an alignment layer on its surface.

16. A laminate according to claim 15, wherein the substrate is a glass plate or a polymer film.

17. A laminate according to claim 15, wherein the apparent refractive index of said laminate satisfies the following formula (1):

$$nX \geq nY > nZ \tag{1}$$

wherein nX and nY are the maximum value and the minimum value, respectively, of in-plane refractive index of the laminate, and nZ is refractive index in the thickness direction of the laminate.

18. A liquid crystal display device comprising a liquid crystal cell comprising a liquid crystal layer held between a pair of substrates provided with electrodes, said liquid crystal layer having positive dielectric anisotropy and oriented substantially horizontally with a helical axis aligned vertically to the substrate when no electrical voltage is applied, at least one polarizing film disposed outside said liquid crystal cell on either upper or lower portions thereof, or both upper and lower outside portions of said liquid crystal cell, and an optically anisotropic film set forth in claim 1 or said film in the form of a laminate which further comprises a transparent or semitransparent substrate having an alignment layer on its surface, which is disposed between said liquid crystal cell and said polarizing film.

19. A liquid crystal display device comprising a liquid crystal cell comprising a liquid crystal layer held between a pair of substrates provided with electrodes, said liquid crystal layer having positive dielectric anisotropy and oriented substantially horizontally to the substrates when no electrical voltage is applied, at least one polarizing film disposed outside said liquid crystal cell on either upper or lower portions thereof, or both upper and lower outside portions of said liquid crystal cell, and an optically anisotropic film set forth in claim 2 or said film in the form of a laminate which further comprises a transparent or semitransparent substrate having an alignment layer on its surface, which is disposed between said liquid crystal cell and said polarizing film.

20. A liquid crystal display device comprising a liquid crystal cell comprising a liquid crystal layer held between a pair of substrates provided with electrodes, said liquid crystal layer having negative dielectric anisotropy and oriented substantially vertically to the substrate when no electrical voltage is applied, a polarizing film disposed outside of said liquid crystal cell, and an optically anisotropic film set forth in claim 2 or said film in the form of a laminate which further comprises a transparent or semitransparent substrate having an alignment layer on its surface, which is disposed between said liquid crystal cell and said polarizing film.

21. A liquid crystal display device according to claim 18, wherein the liquid crystal cell is a TN cell with twisted orientation.

22. A liquid crystal display device according to claim 18, wherein the liquid crystal cell is a STN cell with twisted orientation.

* * * * *